(12) United States Patent
Maresh et al.

(10) Patent No.: US 11,767,006 B2
(45) Date of Patent: Sep. 26, 2023

(54) ROTOR ASSEMBLIES FOR VEHICLE PROPULSION

(71) Applicant: Bell Textron Inc., Fort Worth, TX (US)

(72) Inventors: Andrew Ryan Maresh, Lewisville, TX (US); John Richard McCullough, Weatherford, TX (US); Robert Patrick Wardlaw, Keller, TX (US); Paul K. Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/677,721

(22) Filed: Feb. 22, 2022

(65) Prior Publication Data

US 2023/0145902 A1    May 11, 2023

Related U.S. Application Data

(60) Provisional application No. 63/278,472, filed on Nov. 11, 2021.

(51) Int. Cl.
   *B60V 1/14*      (2006.01)
   *B64C 11/00*     (2006.01)
   *B64C 11/06*     (2006.01)

(52) U.S. Cl.
   CPC .............. *B60V 1/14* (2013.01); *B64C 11/001* (2013.01); *B64C 11/06* (2013.01)

(58) Field of Classification Search
   CPC ........ B60V 1/14; B64C 11/06; F04D 29/0405; F03D 7/0224
   See application file for complete search history.

(56) References Cited

U.S. PATENT DOCUMENTS

| | | | | |
|---|---|---|---|---|
| 4,156,475 | A * | 5/1979 | Chaplin | B60V 1/14 180/117 |
| 4,524,499 | A * | 6/1985 | Grimes et al. | B64C 27/46 416/241 A |
| 7,654,211 | B2 | 2/2010 | Maloney et al. | |
| 2009/0220344 | A1* | 9/2009 | Pfeiffer et al. | B64C 11/06 29/889.6 |
| 2016/0272299 | A1* | 9/2016 | Nagle et al. | B64C 11/06 |
| 2017/0101877 | A1* | 4/2017 | Niergarth et al. | F01D 5/323 |
| 2021/0031744 | A1 | 2/2021 | Allen et al. | |
| 2021/0062661 | A1* | 3/2021 | Loos | F03B 3/128 |

\* cited by examiner

*Primary Examiner* — Topaz L. Elliott
*Assistant Examiner* — Michael K. Reitz
(74) *Attorney, Agent, or Firm* — Lawrence Youst PLLC (57) ABSTRACT

A rotor assembly for generating thrust for a vehicle. The rotor assembly includes a rotor hub and a plurality of rotor blade assemblies coupled to the rotor hub. Each rotor blade assembly includes a metallic bearing race, a composite rotor blade and a metallic coupling assembly. The composite rotor blade has a root section with a radially outwardly tapered outer surface. The metallic coupling assembly has a radially inwardly tapered inner surface that receives the radially outwardly tapered outer surface of the root section of the rotor blade therein to provide a centrifugal force seat for the rotor blade. The coupling assembly includes at least two circumferentially distributed coupling members. The coupling assembly is configured to couple the rotor blade to the bearing race and to provide a centrifugal force load path therebetween.

20 Claims, 6 Drawing Sheets

ROTOR ASSEMBLIES FOR VEHICLE PROPULSION

CROSS-REFERENCE TO RELATED APPLICATIONS

The present application claims the benefit of provisional application number 63/278,472, filed Nov. 11, 2021.

TECHNICAL FIELD OF THE DISCLOSURE

The present disclosure relates, in general, to rotor assemblies operable to generate thrust for the propulsion of a vehicle and, in particular, to rotor assemblies utilizing metallic coupling assemblies that provide centrifugal force load paths between composite rotor blades and the rotor hub.

BACKGROUND

Many vehicles use rotor assemblies to generate thrust that propels the vehicle on or through the water or in the air. A typical rotor assembly has a rotating hub with a plurality of rotor blades radiating therefrom that exert a linear force upon a working fluid, such as water or air, when the rotor assembly is rotated. Specifically, due to the shape of the rotor blades, the rotational motion of the rotor assembly in the fluid causes a pressure difference between the forward and aft surfaces of the rotor blades according to Bernoulli's principle. Many marine vehicles use screw propellers with helical blades that rotate on a horizontal shaft. Aircraft utilize a variety of rotor assemblies for propulsion including twisted airfoil shaped propellers on fixed wing aircraft, rotary wings on helicopters and proprotors on tiltrotor aircraft.

Amphibious air-cushion vehicles that can travel over water and land supported by a downwardly ejected cushion of air are another type of vehicle that uses rotor assemblies to generate thrust. Certain air-cushion vehicles utilize dual ducted rotor assemblies having variable pitch rotor blades to control the speed and direction of the vehicle. The versatile amphibious capability of these vehicles not only enables them to traverse deep water, shallows and reefs but also enables them to drive onto land such as beaches. For example, large air-cushion vehicles such as the Landing Craft Air Cushion (LCAC) and the Ship-to-Shore Connector (SSC) are capable of accessing more than seventy percent of the world's coastline for rapid deployment of large payloads such as vehicles, heavy equipment, supplies and troops. In addition, these large air-cushion vehicles are valuable in supporting humanitarian relief efforts throughout the world including delivering life-saving equipment, food, water and medical supplies.

SUMMARY

In a first aspect, the present disclosure is directed to a rotor assembly for generating thrust for a vehicle. The rotor assembly includes a rotor hub and a plurality of rotor blade assemblies coupled to the rotor hub. Each rotor blade assembly includes a metallic bearing race, a composite rotor blade and a metallic coupling assembly. The composite rotor blade has a root section with a radially outwardly tapered outer surface. The metallic coupling assembly has a radially inwardly tapered inner surface that receives the radially outwardly tapered outer surface of the root section of the rotor blade therein to provide a centrifugal force seat for the rotor blade. The coupling assembly includes at least two circumferentially distributed coupling members. The coupling assembly is configured to couple the rotor blade to the bearing race and to provide a centrifugal force load path therebetween.

In some embodiments, the rotor assembly may include a duct and a plurality of stators that couple the duct to the rotor hub such that the rotor blade assemblies are disposed within the duct. In certain embodiments, each bearing race may include a ball bearing race and a roller bearing race. In some embodiments, each bearing race may be a steel bearing race, each rotor blade may be a carbon fiber rotor blade and/or each coupling assembly may be a titanium coupling assembly. In certain embodiments, for each rotor blade assembly, the bearing race may include a flange end and the coupling assembly may include a flange end. In such embodiments, the flange end of the bearing race may be coupled to the flange end of the coupling assembly with a plurality of bolts that provide a centrifugal force load path between the coupling assembly and the bearing race. In some embodiments, for each rotor blade assembly, the bearing race may include a radially outwardly extending conical end and the coupling assembly may include a radially inwardly extending conical end. In such embodiments, the conical end of the bearing race may be received within the conical end of the coupling assembly to provide a centrifugal force load path between the coupling assembly and the bearing race. Also, in such embodiments, a conical wear ring, such as a segmented conical wear ring, may be disposed between the conical end of the bearing race and the conical end of the coupling assembly to provide a sacrificial element therebetween.

In certain embodiments, for each rotor blade assembly, the coupling assembly may include first and second coupling members each having a flange end. In such embodiments, the flange end of the first coupling member may be coupled to the flange end of the second coupling member with a plurality of bolts to circumferentially secure the coupling assembly about the root section of the rotor blade. In some embodiments, each rotor blade assembly may include at least one circumferential band positioned around the coupling assembly that is configured to circumferentially secure the coupling assembly about the root section of the rotor blade. In certain embodiments, each rotor blade assembly may include a metallic ring disposed within the root section of the rotor blade radially opposite of the radially outwardly tapered outer surface. In some embodiments, each rotor blade assembly may include an anti-rotation element configured to prevent relative rotation between the coupling assembly and the rotor blade. For example, the anti-rotation element may be at least one anti-rotation key disposed between the coupling assembly and the rotor blade or a polygonal interface, such as an octagonal interface, between the coupling assembly and the rotor blade.

In a second aspect, the present disclosure is directed to a vehicle operable for forward motion responsive to thrust. The vehicle includes a rotor assembly having a rotor hub and a plurality of rotor blade assemblies coupled to the rotor hub. Each rotor blade assembly includes a metallic bearing race, a composite rotor blade and a metallic coupling assembly. The composite rotor blade has a root section with a radially outwardly tapered outer surface. The metallic coupling assembly has a radially inwardly tapered inner surface that receives the radially outwardly tapered outer surface of the root section of the rotor blade therein to provide a centrifugal force seat for the rotor blade. The coupling assembly includes at least two circumferentially distributed coupling members. The coupling assembly is configured to couple the rotor blade to the bearing race and to provide a centrifugal force load path therebetween.

In some embodiments, the rotor assembly may be configured to produce thrust when rotating in a working fluid of air. In certain embodiments, the vehicle may be is an amphibious air-cushion vehicle.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
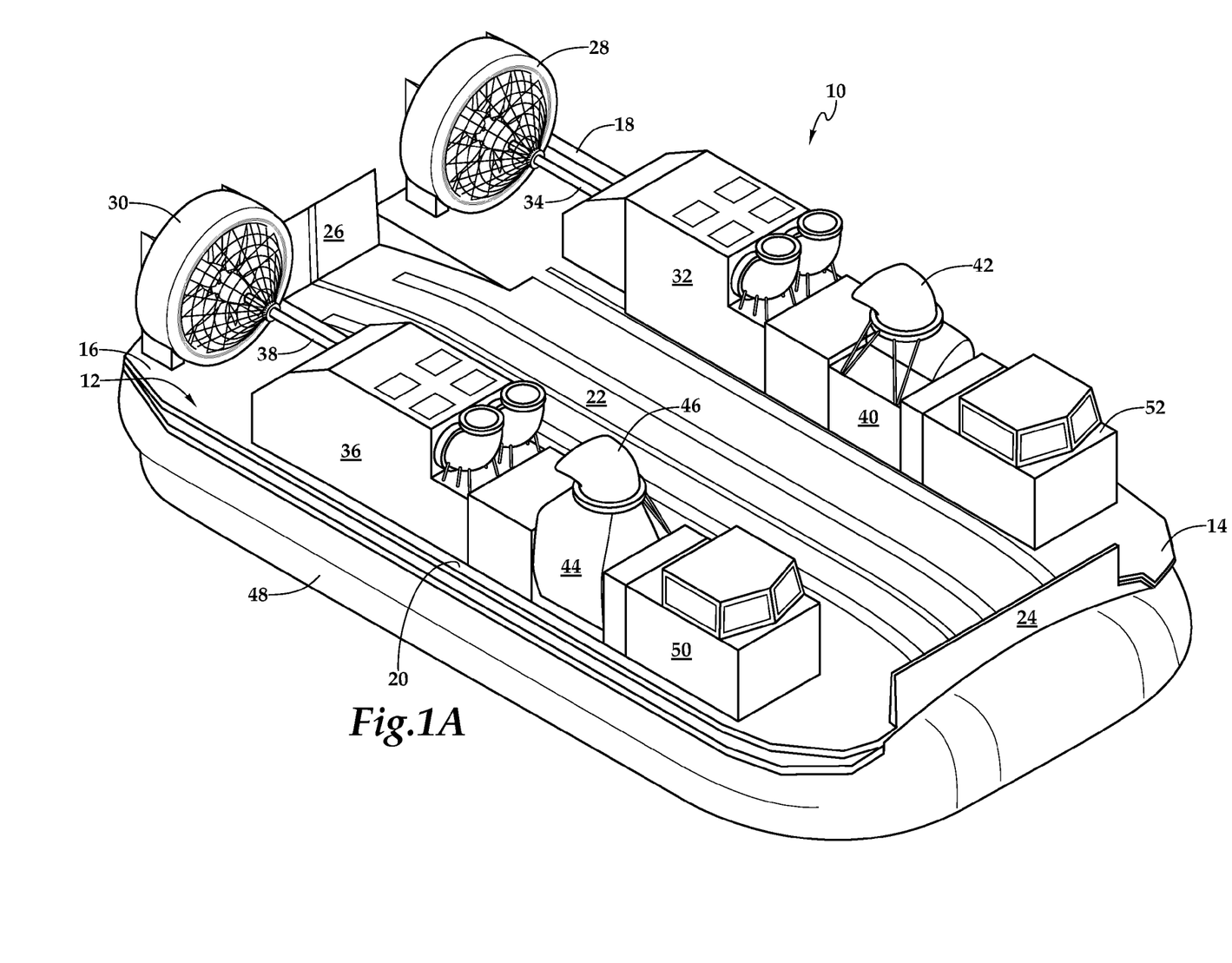
FIGS. 1A-1C are schematic illustrations of an amphibious air-cushion vehicle having dual ducted rotor assemblies for generating thrust in accordance with embodiments of the present disclosure.
Figure 1B:
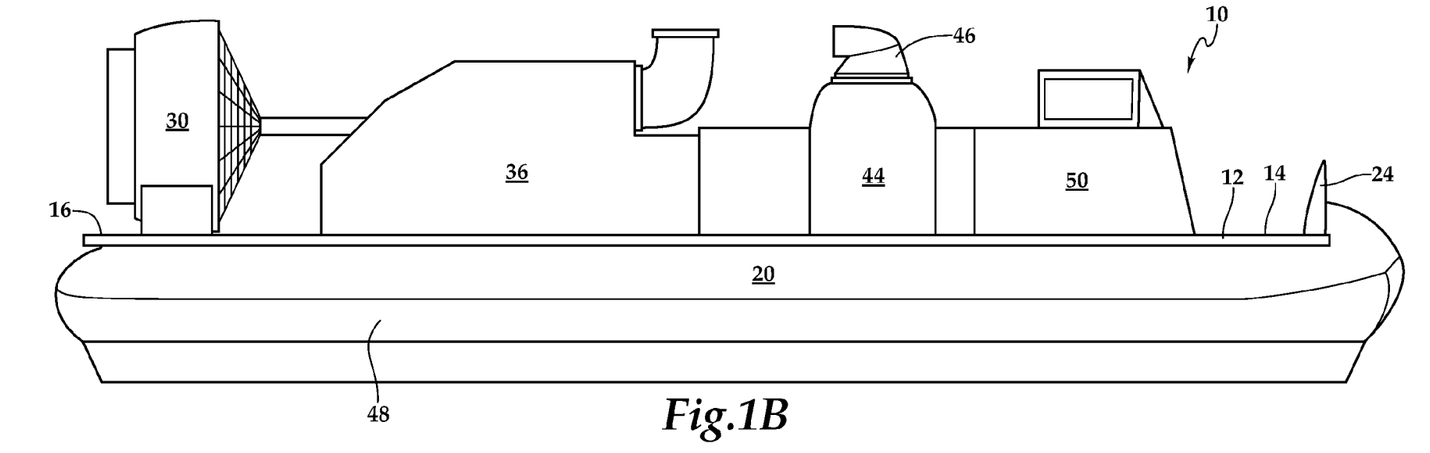
Figure 1C:
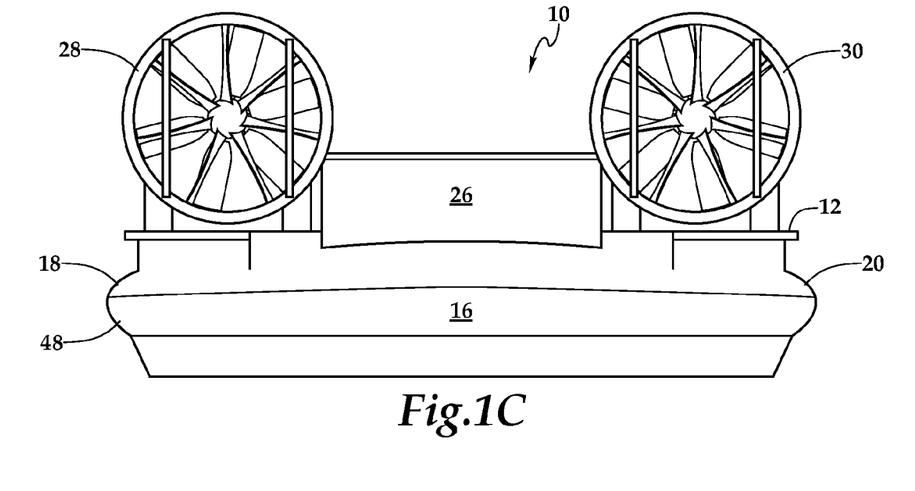

Referring to FIGS. 1A-1C in the drawings, an amphibious air-cushion vehicle is schematically illustrated and generally designated 10. Vehicle 10 includes hull 12 having a bow portion 14, a stern portion 16, a port side 18 and a starboard side 20. In the illustrated embodiment, vehicle 10 includes an open deck space 22, a bow ramp 24 and a stern ramp 26 enabling roll-on/roll-off loading and unloading of cargo and equipment including, for example, high-speed offloading during a cargo drop scenario into a hostile landing area. Vehicle 10 is equipped with dual ducted air propulsors depicted as port rotor assembly 28 and starboard rotor assembly 30. Rotor assembly 28 is driven by a gas turbine engine 32 via a drive shaft 34. Rotor assembly 30 is driven by a gas turbine engine 36 via a drive shaft 38. Gas turbine engine 32 also drives a lift fan 40 and a bow thruster 42. Likewise, gas turbine engine 36 also drives a lift fan 44 and a bow thruster 46. Lift fans 40, 44 are used to produce large volumes air that form an air cushion below hull 12 and within a skirt 48 that lifts hull 12 such that vehicle 10 floats above a running surface such as water or land. Bow thrusters 42, 46 are used to enhance the maneuverability of vehicle 10 particularly at lower speeds. Vehicle 10 includes a pilot and copilot module 50 that supports the command and control station of vehicle 10. Vehicle 10 also includes a personnel and equipment module 52.

Figure 2A:
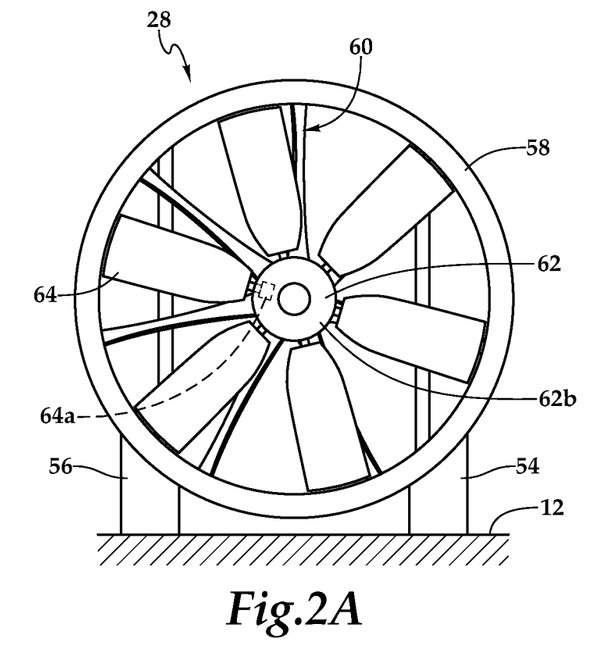
FIGS. 2A-2B are schematic illustrations of a ducted rotor assembly for generating vehicle thrust in accordance with embodiments of the present disclosure.
Figure 2B:
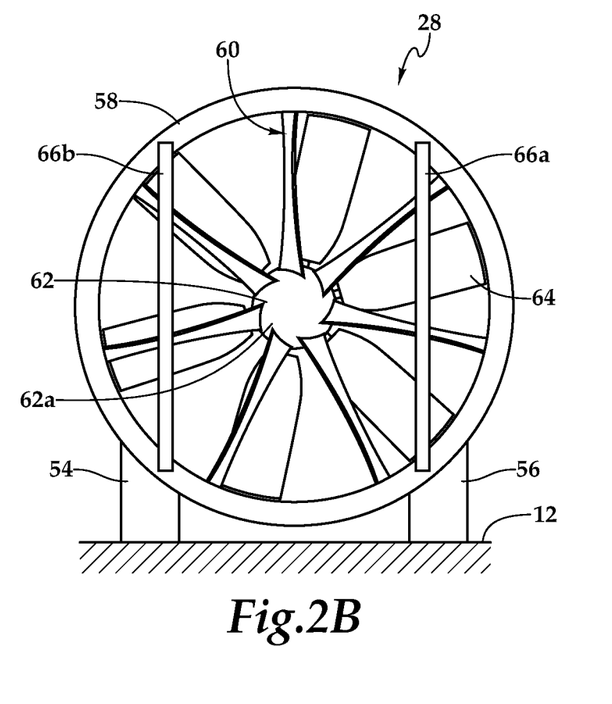

Referring additionally to FIGS. 2A-2B in the drawings, rotor assembly 28 is disclosed in further detail. Rotor assembly 30 is substantially similar to rotor assembly 28 therefore, for sake of efficiency, certain features will be disclosed only with regard to rotor assembly 28. One having ordinary skill in the art, however, will fully appreciate an understanding of rotor assembly 30 based upon the disclosure herein of rotor assembly 28. FIG. 2A depicts rotor assembly 28 from the inlet side or a forward perspective and FIG. 2B depicts rotor assembly 28 from the outlet side or an aft perspective. A forward screen, as best seen in FIG. 1A, has been removed from rotor assembly 28 for clarity. Rotor assembly 28 is coupled to hull 12 of vehicle 10 by a suitable support structure depicted as a pair of pedestals 54, 56. Rotor assembly 28 includes a generally cylindrical outer duct 58 that is preferrable formed from a strong and lightweight material such as a carbon fiber composite. In the illustrated embodiment, rotor assembly 28 includes a stator system 60 having seven twisted stators that are formed from a strong and lightweight material such as a carbon fiber composite. In other embodiments, stator system 60 may include other numbers of stators both greater than or less than seven, the stators could have other designs such as straight stators and/or the stators could be formed from other materials such as metals including aluminum.

Stator system 60 supports a rotor hub 62 within duct 58 of rotor assembly 28. Rotor hub 62 includes a fixed portion 62a that is coupled to stator system 60 and a rotating portion 62b that is coupled to a plurality of rotor blade assemblies 64. Rotor hub 62 houses structural and control components that support the centrifugal force generated by rotor blade assemblies 64 and enable collective pitch operations of rotor blade assemblies 64 to provide variable thrust to vehicle 10. Specifically, each rotor blade assembly 64 is coupled to a bearing assembly 64a disposed within rotor hub 62, such as a bearing assembly that includes a ball bearing set and a roller bearing set, that react centrifugal and bending loads from the rotor blade assembly 64 during rotary operations and collective pitch change operations. In the illustrated embodiment, rotor assembly 28 includes six rotor blade assemblies 64 that are formed from a strong and lightweight material such as a carbon fiber composite. In other embodiments, rotor assembly 28 may include other numbers of rotor blade assemblies both greater than or less than six. In the illustrated embodiment, rotor assembly 28 includes a pair of vertically extending rudders 66a, 66b that are coupled to the aft side of duct 58. Rudders 66a, 66b are rotatable relative to duct 58 to control the direction of thrust from rotor assembly 28 and thus the direction of travel of vehicle 10.

Figure 3A:
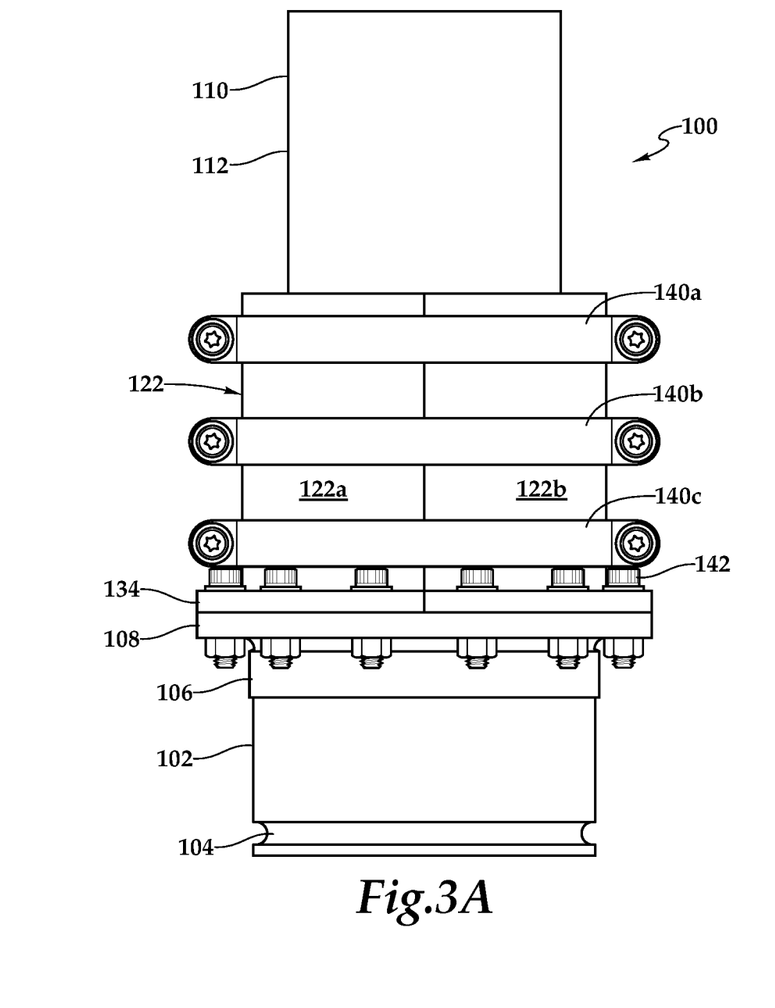
FIGS. 3A-3B are front and cross sectional views of a metallic coupling assembly coupling a composite rotor blade to a metallic bearing race to provide a centrifugal force load path therebetween in accordance with embodiments of the present disclosure.
Figure 3B:
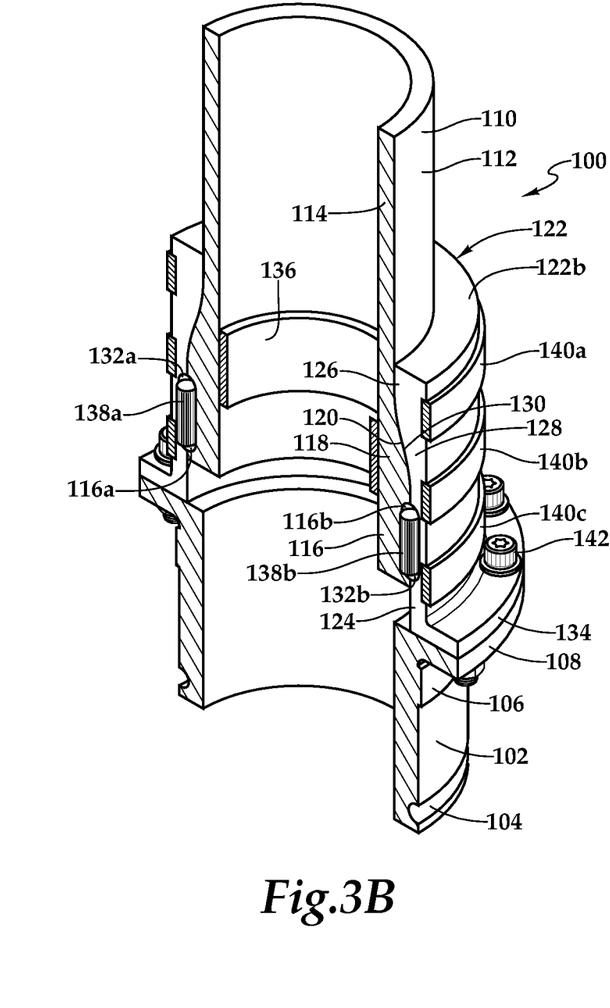

Referring next to FIGS. 3A-3B in the drawings, component parts of a rotor blade assembly 100 that is representative of rotor blade assemblies 64 will now be discussed. Rotor blade assembly 100 includes a metallic bearing race 102, depicted as including a ball bearing race 104 and a roller bearing race 106, that is received within and supported by one of the bearing assemblies 64a of rotor hub 62. Bearing race 102 includes a flange end 108 having a plurality of bolt openings. In the illustrated embodiment, bearing race 102 is a steel component machined to the desired specifications and tolerances. Rotor blade assembly 100 includes a composite rotor blade 110 with only the root section 112 being visible in the drawings. Rotor blade 110 is preferably a monolithic structure formed using a broad goods and/or layered tape construction process having a manual or automated layup of a plurality of composite broad goods material layers such as carbon fabric, carbon tape and combinations thereof. After curing, the material layers form a high strength, lightweight solid composite member.

Root section 112 of rotor blade 110 has a generally cylindrical shape with a constant inner diameter along its length but a changing outer diameter along its length. More specifically, root section 112 has an outboard section 114 having a first wall thickness and an inboard section 116 having a second wall thickness that is greater than the first wall thickness with a tapered section 118 therebetween having a radially outwardly tapered outer surface 120 extending from outboard section 114 to inboard section 116. In the illustrated embodiment, the ratio of the wall thicknesses of inboard section 116 to outboard section 114 is about 2 to 1. In other embodiments, the wall thicknesses of inboard section 116 and outboard section 114 may have other ratios both greater than or less than 2 to 1 including 4 to 1, 3 to 1, 5 to 2, 3 to 2 or other desired wall thickness ratio. Radially outwardly tapered outer surface 120 may progress in a linear or nonlinear manner and may have different contours or slopes in different portions thereof. As such, it should be understood by those skilled in the art that the profile of radially outwardly tapered outer surface 120 will be determined based upon structural and dynamic analysis for the specific implementation including, for example, the centrifugal load requirement of tapered section 118. In the illustrated embodiment, inboard section 116 of root section 112 includes a pair of oppositely disposed pockets 116a, 116b.

In the illustrated embodiment, rotor blade assembly 100 includes a metallic coupling assembly 122 depicted as two semi-cylindrical coupling members 122a, 122b that together form a substantially cylindrical coupling assembly. In other embodiments, a multi-piece coupling assembly may include more than two circumferentially distributed coupling members that together form a substantially cylindrical coupling assembly. Coupling assembly 122 has a generally constant outer diameter along its length but a changing inner diameter along its length. More specifically, an inboard section 124 of coupling assembly 122 has a first wall thickness and an outboard section 126 of coupling assembly 122 has a second wall thickness that is greater than the first wall thickness with a tapered section 128 therebetween having a radially inwardly tapered inner surface 130 extending from inboard section 124 to outboard section 126. In the illustrated embodiment, the ratio of the wall thicknesses of outboard section 126 and inboard section 124 is about 2 to 1. In other embodiments, the wall thicknesses of outboard section 126 and inboard section 124 may have other ratios both greater than or less than 2 to 1 including 4 to 1, 3 to 1, 5 to 2, 3 to 2 or other desired wall thickness ratio. Radially inwardly tapered inner surface 130 has a matching profile with radially outwardly tapered outer surface 120 such that radially inwardly tapered inner surface 130 provides a centrifugal force seat for radially outwardly tapered outer surface 120 and thus for rotor blade 110. A compliant layer, such as an adhesive layer or polymer layer, may provide an interface between radially inwardly tapered inner surface 130 and radially outwardly tapered outer surface 120 that may allow for certain strain resolution between rotor blade 110 and coupling assembly 122. In the illustrated embodiment, coupling assembly 122 includes a pair of oppositely disposed pockets 132a, 132b. In addition, coupling assembly 122 includes a flange end 134 having a plurality of bolt openings. In the illustrated embodiment, coupling assembly 122 is a titanium component machined to the desired specifications and tolerances. In other embodiments, coupling assembly 122 could be formed from other metals such as aluminum.

An assembly process for rotor blade assembly 100 will now be described. As best seen in FIG. 3B, a metallic support ring 136 is disposed within root section 112 of rotor blade 110 generally radially aligned with tapered section 118. Metallic support ring 136 provides added hoop strength to root section 112 at tapered section 118 to prevent any deformation of root section 112 responsive to centrifugal and/or bending loads. Coupling member 122b is then positioned relative to root section 112 such that radially inwardly tapered inner surface 130 mates with radially outwardly tapered outer surface 120 and such that pockets 116a, 116b of inboard section 116 are aligned with pockets 132a, 132b of coupling member 122b. Anti-rotation keys 138a, 138b are placed within the cavities created respectively by pockets 116a, 132a and pockets 116b, 132b. Coupling member 122a may now be positioned relative to root section 112 such that radially inwardly tapered inner surface 130 mates with radially outwardly tapered outer surface 120 and such that pockets 116a, 116b of inboard section 116 are aligned with pockets 132a, 132b of coupling member 122a. In this manner, anti-rotation keys 138a, 138b are captured between rotor blade 110 and coupling assembly 122 and serve as an anti-rotation element to prevent relative rotation therebetween when rotor blade assembly 100 is fully assembled. Even though two anti-rotation keys have been depicted and described, it should be understood by those having ordinary skill in the art that any number of anti-rotation keys could be circumferentially distributed between rotor blade 110 and coupling assembly 122.

The two parts of coupling assembly 122 may now be circumferentially secured together about root section 112 of rotor blade 110. In the illustrated embodiment, this is achieved using three circumferential bands 140a, 140b, 140c that are received within radially inwardly projecting channels in coupling members 122a, 122b. Circumferential bands 140a, 140b, 140c each include two semi-circumferential members that are coupled together with bolts, as best seen in FIG. 3A. In this manner, coupling members 122a, 122b are secured together and secured to root section 112 of rotor blade 110. Even though circumferential bands 140a, 140b, 140c have been depicted and described as being secured about coupling assembly 122 with tension bolts, it should be understood by those having ordinary skill in the art that circumferential bands of the present disclosure could alternatively be secured about coupling assembly 122 with one or more shear bolts. Flange end 134 of coupling assembly 122 is now positioned relative to flange end 108 of bearing race 102 such that the respective bolt openings are aligned. A plurality of bolts 142 may now be used to secured coupling assembly 122 to bearing race 102 such that bolts 142 provide a centrifugal force load path therebetween and prevent relative rotation therebetween. In this manner, a centrifugal force load path is provided between composite rotor blade 110 and metallic bearing race 102 by metallic coupling assembly 122.

Figure 4A:
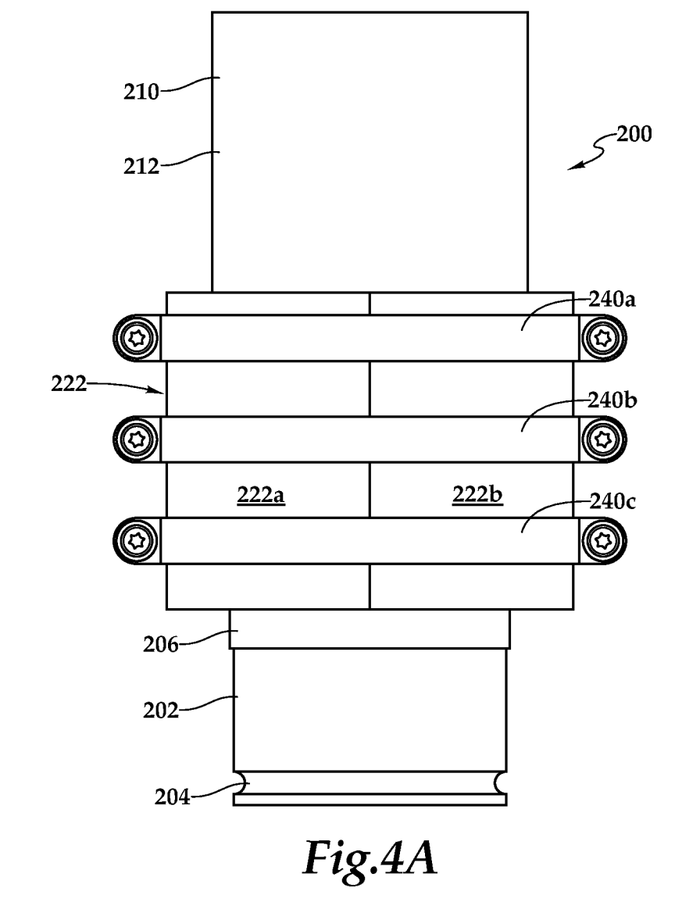
FIGS. 4A-4B are front and cross sectional views of a metallic coupling assembly coupling a composite rotor blade to a metallic bearing race to provide a centrifugal force load path therebetween in accordance with embodiments of the present disclosure.
Figure 4B:
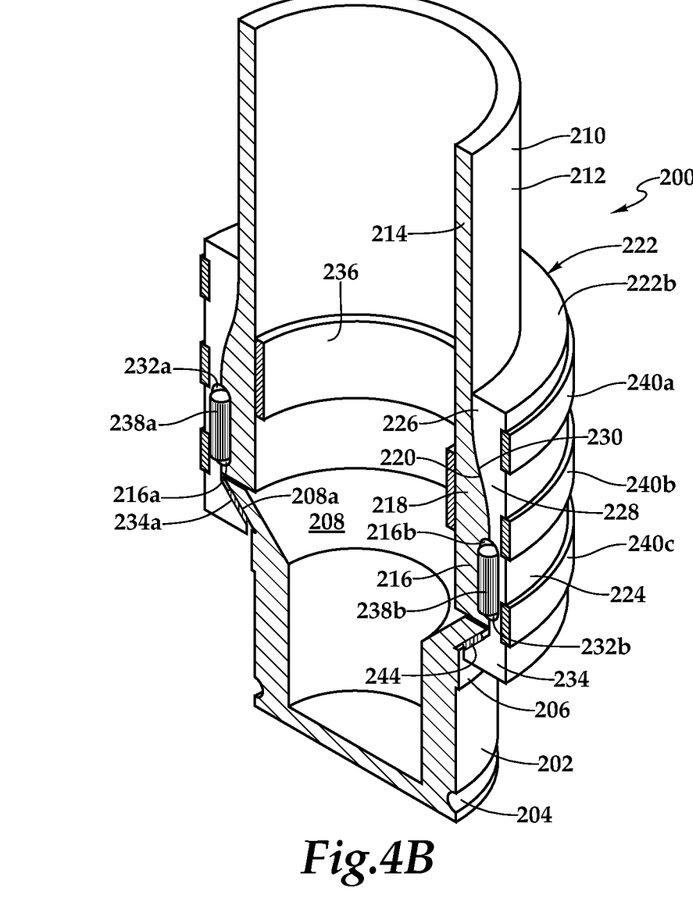

Referring next to FIGS. 4A-4B in the drawings, component parts of a rotor blade assembly 200 that is representative of rotor blade assemblies 64 will now be discussed. Rotor blade assembly 200 includes a metallic bearing race 202, depicted as including a ball bearing race 204 and a roller bearing race 206, that is received within and supported by one of the bearing assemblies 64a of rotor hub 62. Bearing race 202 includes a radially outwardly extending conical end 208 having an outer conical surface 208a. Rotor blade assembly 200 includes a composite rotor blade 210 with only the root section 212 being visible in the drawings. Root section 212 of rotor blade 210 has a generally cylindrical shape with a constant inner diameter along its length but a changing outer diameter along its length. More specifically, root section 212 has an outboard section 214 having a first wall thickness and an inboard section 216 having a second wall thickness that is greater than the first wall thickness with a tapered section 218 therebetween having a radially outwardly tapered outer surface 220 extending from outboard section 214 to inboard section 216. Radially outwardly tapered outer surface 220 may progress in a linear or nonlinear manner and may have different contours or slopes in different portions thereof. In the illustrated embodiment, inboard section 216 of root section 212 includes a pair of oppositely disposed pockets 216a, 216b.

Rotor blade assembly 200 includes a metallic coupling assembly 222 depicted as two semi-cylindrical coupling members 222a, 222b that together form a substantially cylindrical coupling assembly with a generally constant outer diameter along its length but a changing inner diameter along its length. More specifically, an inboard section 224 of coupling assembly 222 has a first wall thickness and an outboard section 226 of coupling assembly 222 has a second wall thickness that is greater than the first wall thickness with a tapered section 228 therebetween having a radially inwardly tapered inner surface 230 extending from inboard section 224 to outboard section 226. Radially inwardly tapered inner surface 230 has a matching profile with radially outwardly tapered outer surface 220 such that radially inwardly tapered inner surface 230 provides a centrifugal force seat for radially outwardly tapered outer surface 220 and thus for rotor blade 210. A compliant layer, such as an adhesive layer or polymer layer, may provide an interface between radially inwardly tapered inner surface 230 and radially outwardly tapered outer surface 220 that may allow for certain strain resolution between rotor blade 210 and coupling assembly 222. In the illustrated embodiment, coupling assembly 222 includes a pair of oppositely disposed pockets 232a, 232b. In addition, coupling assembly 222 includes a radially inwardly extending conical end 234 having an inner conical surface 234a.

An assembly process for rotor blade assembly 200 will now be described. As best seen in FIG. 4B, a metallic support ring 236 is disposed within root section 212 of rotor blade 210 generally radially aligned with tapered section 218. An upper surface of bearing race 202 is positioned relative to a lower surface of rotor blade 210. A conical wear ring 244, such as a segmented conical wear ring, is positioned proximate outer conical surface 208a of bearing race 202. Coupling member 222b is positioned relative to root section 212 such that radially inwardly tapered inner surface 230 mates with radially outwardly tapered outer surface 220 and such that pockets 216a, 216b of inboard section 216 are aligned with pockets 232a, 232b of coupling member 222b. At the same time, coupling member 222b is positioned relative to bearing race 202 such that radially outwardly extending conical end 208 of bearing race 202 is positioned within radially inwardly extending conical end 234 with conical wear ring 244 positioned between inner conical surface 234a and outer conical surface 208a. Conical wear ring 244 is a metal wear ring that is softer than the metal of bearing race 202 and coupling assembly 222 such that conical wear ring 244 acts as a sacrificial element. In certain embodiments, inner conical surface 234a and/or outer conical surface 208a may be surface treated such that they are much harder than conical wear ring 244. Anti-rotation keys 238a, 238b are placed within the cavities created respectively by pockets 216a, 232a and pockets 216b, 232b.

Coupling member 222a may now be positioned relative to root section 212 such that radially inwardly tapered inner surface 230 mates with radially outwardly tapered outer surface 220 and such that pockets 216a, 216b of inboard section 216 are aligned with pockets 232a, 232b of coupling member 222a. At the same time, coupling member 222a is positioned relative to bearing race 202 such that radially outwardly extending conical end 208 of bearing race 202 is positioned within radially inwardly extending conical end 234 with conical wear ring 244 positioned between inner conical surface 234a and outer conical surface 208a. In this manner, anti-rotation keys 238a, 238b are captured between rotor blade 210 and coupling assembly 222 and serve as an anti-rotation element to prevent relative rotation therebetween when rotor blade assembly 200 is fully assembled. The two parts of coupling assembly 222 may now be circumferentially secured together about root section 212 of rotor blade 210 and radially outwardly extending conical end 208 of bearing race 202. In the illustrated embodiment, this is achieved using three circumferential bands 240a, 240b, 240c that are received within radially inwardly projecting channels in coupling members 222a, 222b. Circumferential bands 240a, 240b, 240c each include two semi-circumferential members that are coupled together with bolts, as best seen in FIG. 4A. In this manner, coupling members 222a, 222b are secured together and secured to root section 212 of rotor blade 210 and radially outwardly extending conical end 208 of bearing race 202. In this manner, a centrifugal force load path is provided between composite rotor blade 210 and metallic bearing race 202 by metallic coupling assembly 222. In the illustrated embodiment, the friction between inner conical surface 234a, conical wear ring 244 and outer conical surface 208 generated by the centrifugal force supported between metallic bearing race 202 and metallic coupling assembly 222 during rotary operations, provides an anti-rotation element therebetween.

Figure 5A:
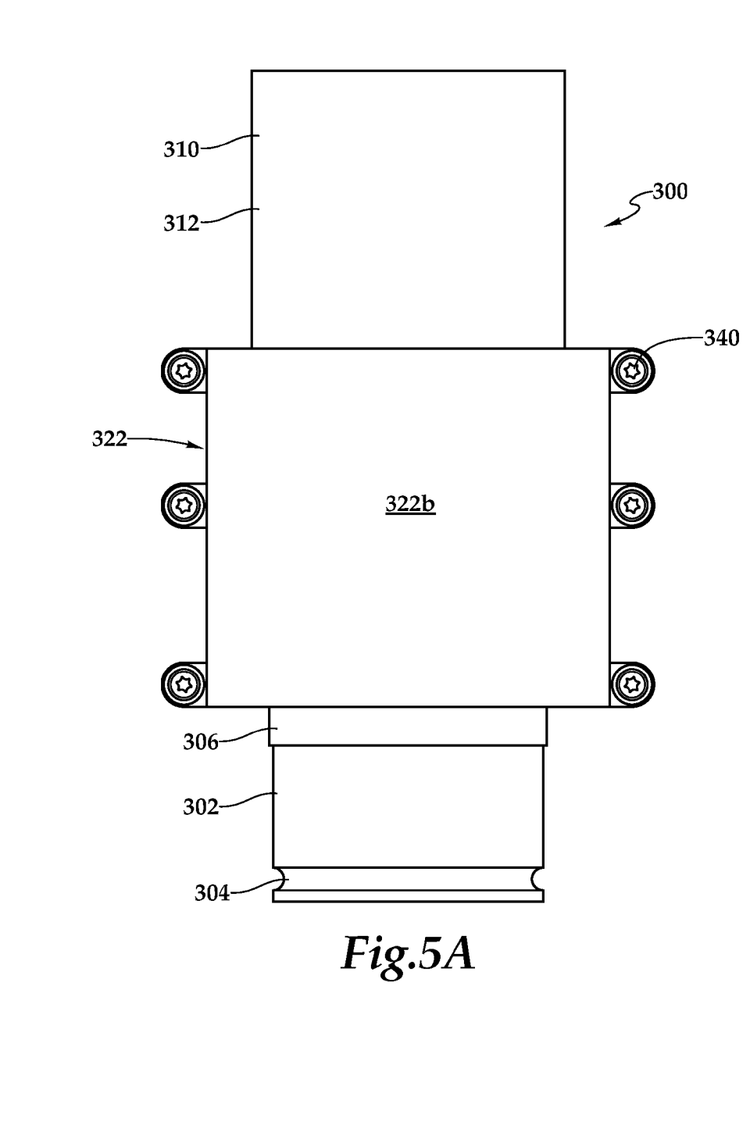
FIGS. 5A-5B are front and cross sectional views of a metallic coupling assembly coupling a composite rotor blade to a metallic bearing race to provide a centrifugal force load path therebetween in accordance with embodiments of the present disclosure.
Figure 5B:
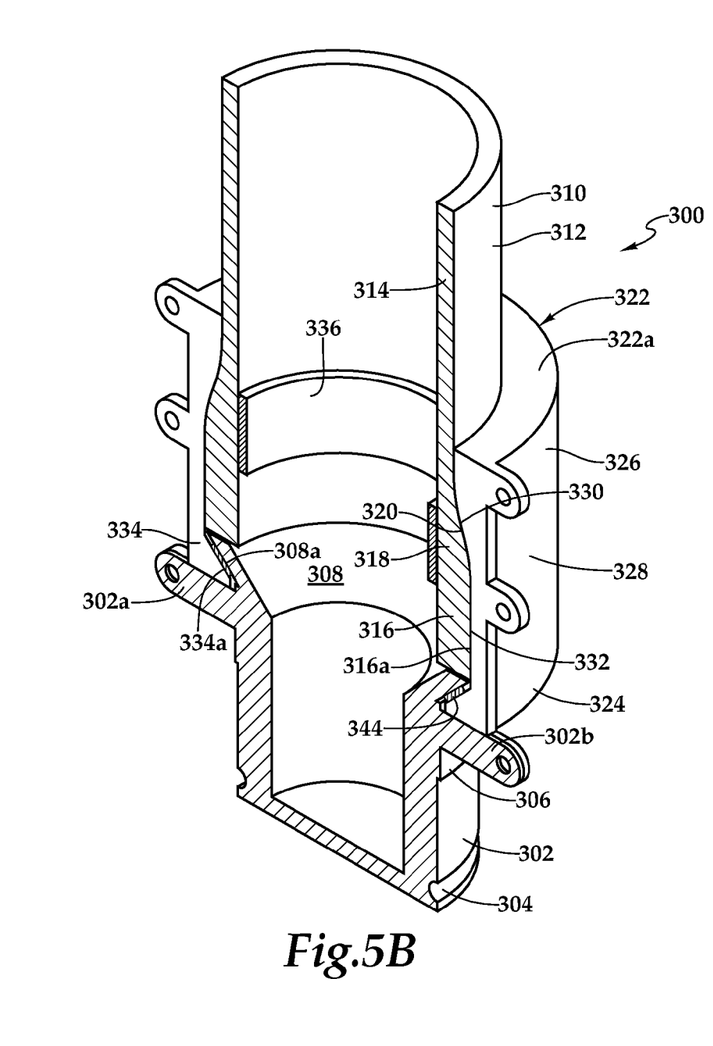

Referring next to FIGS. 5A-5B in the drawings, component parts of a rotor blade assembly 300 that is representative of rotor blade assemblies 64 will now be discussed. Rotor blade assembly 300 includes a metallic bearing race 302, depicted as including a ball bearing race 304 and a roller bearing race 306, that is received within and supported by one of the bearing assemblies 64a of rotor hub 62. Bearing race 302 includes a radially outwardly extending conical end 308 having an outer conical surface 308a. Bearing race 302 also includes radially extending lugs 302a, 302b. Rotor blade assembly 300 includes a composite rotor blade 310 with only the root section 312 being visible in the drawings. Root section 312 of rotor blade 310 has a generally cylindrical shape with a constant inner diameter along its length but a changing outer diameter along its length. More specifically, root section 312 has an outboard section 314 having a first wall thickness and an inboard section 316 having a second wall thickness that is greater than the first wall thickness with a tapered section 318 therebetween having a radially outwardly tapered outer surface 320 extending from outboard section 314 to inboard section 316. Radially outwardly tapered outer surface 320 may progress in a linear or nonlinear manner and may have different contours or slopes in different portions thereof. In the illustrated embodiment, inboard section 316 of root section 312 has a polygonal shaped outer perimeter depicted as an octagonal shaped outer perimeter 316a.

Rotor blade assembly 300 includes a metallic coupling assembly 322 depicted as two semi-cylindrical coupling members 322a, 322b each having a flange end that together form a substantially cylindrical coupling assembly with a generally constant outer diameter along its length but a changing inner diameter along its length. More specifically, an inboard section 324 of coupling assembly 322 has a first wall thickness and an outboard section 326 of coupling assembly 322 has a second wall thickness that is greater than the first wall thickness with a tapered section 328 therebetween having a radially inwardly tapered inner surface 330 extending from inboard section 324 to outboard section 326. Radially inwardly tapered inner surface 330 has a matching profile with radially outwardly tapered outer surface 320 such that radially inwardly tapered inner surface 330 provides a centrifugal force seat for radially outwardly tapered outer surface 320 and thus for rotor blade 310. A compliant layer, such as an adhesive layer or polymer layer, may provide an interface between radially inwardly tapered inner surface 330 and radially outwardly tapered outer surface 320 that may allow for certain strain resolution between rotor blade 310 and coupling assembly 322. In the illustrated embodiment, coupling assembly 322 has a polygonal shaped inner perimeter depicted as an octagonal shaped inner perimeter 332. In addition, coupling assembly 322 includes a radially inwardly extending conical end 334 having an inner conical surface 334a.

An assembly process for rotor blade assembly 300 will now be described. As best seen in FIG. 5B, a metallic support ring 336 is disposed within root section 312 of rotor blade 310 generally radially aligned with tapered section 318. An upper surface of bearing race 302 is positioned relative to a lower surface of rotor blade 310. A conical wear ring 344, such as a segmented conical wear ring, is positioned proximate outer conical surface 308a of bearing race 302. Coupling member 322b is positioned relative to root section 312 such that radially inwardly tapered inner surface 330 mates with radially outwardly tapered outer surface 320 and such that octagonal shaped outer perimeter 316a mates with octagonal shaped inner perimeter 332. At the same time, coupling member 322b is positioned relative to bearing race 302 such that radially outwardly extending conical end 308 of bearing race 302 is positioned within radially inwardly extending conical end 334 with conical wear ring 344 positioned between inner conical surface 334a and outer conical surface 308a. Lugs 302a, 302b are received within notches in the flange end of coupling member 322b.

Coupling member 322a may now be positioned relative to root section 312 such that radially inwardly tapered inner surface 330 mates with radially outwardly tapered outer surface 320 and such that octagonal shaped outer perimeter 316a mates with octagonal shaped inner perimeter 332. At the same time, coupling member 322a is positioned relative to bearing race 302 such that radially outwardly extending conical end 308 of bearing race 302 is positioned within radially inwardly extending conical end 334 with conical wear ring 344 positioned between inner conical surface 334a and outer conical surface 308a. Lugs 302a, 302b are also received within notches in the flange end of coupling member 322a. In this manner, octagonal shaped outer perimeter 316a and octagonal shaped inner perimeter 332 create a polygonal interface and in this case an octagonal interface that serves as an anti-rotation element to prevent relative rotation between coupling assembly 322 and rotor blade 310 when rotor blade assembly 300 is fully assembled. The two parts of coupling assembly 322 may now be circumferentially secured together about root section 312 of rotor blade 310 and radially outwardly extending conical end 308 of bearing race 302. In the illustrated embodiment, this is achieved using a plurality of bolts 340 to couple flange ends of coupling members 322a, 322b together, as best seen in FIG. 5A. In this manner, coupling members 322a, 322b are secured together and secured to root section 312 of rotor blade 310 and radially outwardly extending conical end 308 of bearing race 302. A centrifugal force load path is provided between composite rotor blade 310 and metallic bearing race 302 by metallic coupling assembly 322. In addition, as lugs 302a, 302b of bearing race 302 are clamped and bolted between the flange ends of coupling members 322a, 322b, this provides an anti-rotation element between metallic coupling assembly 322 and bearing race 302.

Compared to prior mechanisms for coupling composite rotor blades to metallic bearing races, the present embodiments provide for the use of a larger diameter root section without requiring a larger diameter hub, thereby increasing the root to chord ratio of the rotor blade as well as the strength and durability of the root section thereof. In addition, the use of the coupling assemblies of the present embodiments, allows for inspection of the rotor blades and in particular inspection of the root sections of the rotor blades as each rotor blade is removable from the rotor hub by disconnection of the coupling assembly. This removability feature also allows for the replacement of wearable components or any individual components of the rotor assembly as requiring according to a maintenance schedule or as discovered during an inspection.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotor assembly for generating thrust for a vehicle, the rotor assembly comprising:
    a rotor hub; and
    a plurality of rotor blade assemblies coupled to the rotor hub, each rotor blade assembly having a pitch change axis and each rotor blade assembly including:
        a metallic bearing race having a conical end that extends radially outwardly relative to the pitch change axis;
        a composite rotor blade having a root section with an outer surface that is radially outwardly tapered relative to the pitch change axis; and
        a metallic coupling assembly having an inner surface that is radially inwardly tapered relative to the pitch change axis and a conical end that extends radially inwardly relative to the pitch change axis;
        wherein, the outer surface of the root section of the rotor blade is received within the inner surface of the coupling assembly to provide a centrifugal force seat for the rotor blade, the coupling assembly including at least two circumferentially distributed coupling members, the coupling assembly configured to couple the rotor blade to the bearing race and to provide a centrifugal force load path therebetween; and
        wherein, the conical end of the bearing race is received within the conical end of the coupling assembly to provide a centrifugal force load path therebetween.

2. The rotor assembly as recited in claim 1 further comprising a duct and a plurality of stators coupling the duct to the rotor hub such that the rotor blade assemblies are disposed within the duct.

3. The rotor assembly as recited in claim 1 wherein each bearing race further comprises a ball bearing race and a roller bearing race.

4. The rotor assembly as recited in claim 1 wherein each bearing race is a steel bearing race.

5. The rotor assembly as recited in claim 1 wherein each rotor blade is a carbon fiber rotor blade.

6. The rotor assembly as recited in claim 1 wherein each coupling assembly is a titanium coupling assembly.

7. The rotor assembly as recited in claim 1 wherein each rotor blade assembly further comprises a conical wear ring disposed between the conical end of the bearing race and the conical end of the coupling assembly.

8. The rotor assembly as recited in claim 7 wherein each conical wear ring is a segmented conical wear ring.

9. The rotor assembly as recited in claim 1 wherein each rotor blade assembly further comprises at least one circumferential band positioned around the coupling assembly configured to circumferentially secure the coupling assembly about the root section of the rotor blade.

10. The rotor assembly as recited in claim 1 wherein each rotor blade assembly further comprises a metallic ring disposed within the root section of the rotor blade.

11. The rotor assembly as recited in claim 1 wherein each rotor blade assembly further comprises an anti-rotation element configured to prevent relative rotation between the coupling assembly and the rotor blade.

12. The rotor assembly as recited in claim 11 wherein, for each rotor blade assembly, the anti-rotation element further comprises at least one anti-rotation key disposed between the coupling assembly and the rotor blade.

13. A vehicle operable for forward motion responsive to thrust, the vehicle comprising:
    a rotor assembly including a rotor hub and a plurality of rotor blade assemblies coupled to the rotor hub, each rotor blade assembly having a pitch change axis and each rotor blade assembly including:
        a metallic bearing race having a conical end that extends radially outwardly relative to the pitch change axis;
        a composite rotor blade having a root section with an outer surface that is radially outwardly tapered relative to the pitch change axis; and
        a metallic coupling assembly having an inner surface that is radially inwardly tapered relative to the pitch change axis and a conical end that extends radially inwardly relative to the pitch change axis;
        wherein, the outer surface of the root section of the rotor blade is received within the inner surface of the coupling assembly to provide a centrifugal force seat for the rotor blade, the coupling assembly including at least two circumferentially distributed coupling members, the coupling assembly configured to couple the rotor blade to the bearing race and to provide a centrifugal force load path therebetween; and
        wherein, the conical end of the bearing race is received within the conical end of the coupling assembly to provide a centrifugal force load path therebetween.

14. The vehicle as recited in claim 13 wherein the rotor assembly is configured to produce thrust when rotating in a working fluid of air.

15. The vehicle as recited in claim 13 wherein the vehicle is an amphibious air-cushion vehicle.

16. The vehicle as recited in claim 13 further comprising a duct and a plurality of stators coupling the duct to the rotor hub such that the rotor blade assemblies are disposed within the duct.

17. The vehicle as recited in claim 13 wherein each rotor blade assembly further comprises a conical wear ring disposed between the conical end of the bearing race and the conical end of the coupling assembly.

18. The vehicle as recited in claim 13 wherein each rotor blade assembly further comprises at least one circumferential band positioned around the coupling assembly configured to circumferentially secure the coupling assembly about the root section of the rotor blade.

19. The vehicle as recited in claim 13 wherein each rotor blade assembly further comprises a metallic ring disposed within the root section of the rotor blade.

20. The vehicle as recited in claim 13 wherein each rotor blade assembly further comprises at least one anti-rotation key disposed between the coupling assembly and the rotor blade.

* * * * *